(12) United States Patent
Wei et al.

(10) Patent No.: US 10,384,660 B2
(45) Date of Patent: Aug. 20, 2019

(54) SLOW SPEED AUTOMATED VEHICLE BRAKE PRESSURE CONTROL SYSTEM

(71) Applicant: Aptiv Technologies Limited, St. Michael (BB)

(72) Inventors: Junqing Wei, Bridgeville, PA (US); Ludong Sun, Pittsburgh, PA (US); Zachary Thomas Batts, Pittsburgh, PA (US); Jarrod M. Snider, Pittsburgh, PA (US)

(73) Assignee: Aptiv Technologies Limited, St. Michael ( * ) Notice: Subject to any disclaimer, the term of this patent is extended or adjusted under 35 U.S.C. 154(b) by 58 days.

(21) Appl. No.: 15/619,939

(22) Filed: Jun. 12, 2017

(65) Prior Publication Data

US 2018/0354480 A1 Dec. 13, 2018

(51) Int. Cl.
*B60T 8/32* (2006.01)
*B60W 30/09* (2012.01)
*B60T 8/172* (2006.01)
*B60W 30/17* (2012.01)

(52) U.S. Cl.
CPC .............. *B60T 8/32* (2013.01); *B60T 8/172* (2013.01); *B60W 30/09* (2013.01); *B60W 30/17* (2013.01); *B60T 2230/04* (2013.01); *B60T 2250/04* (2013.01)

(58) Field of Classification Search
CPC ........ B60T 8/32; B60T 8/172; B60T 2230/04; B60T 2250/04; B60W 30/09; B60W 30/17
USPC .......................................................... 701/70
See application file for complete search history.

(56) References Cited

U.S. PATENT DOCUMENTS

| | | | |
|---|---|---|---|
| 2007/0182243 A1 | 8/2007 | Osborn et al. | |
| 2011/0208398 A1* | 8/2011 | Inoue | B60T 8/172 701/96 |
| 2012/0095660 A1* | 4/2012 | Breuer | B60T 7/18 701/70 |
| 2012/0239266 A1 | 9/2012 | Kato et al. | |
| 2014/0184785 A1 | 7/2014 | Sperrle | |

(Continued)

FOREIGN PATENT DOCUMENTS

| | | |
|---|---|---|
| DE | 102007060858 | 6/2009 |
| WO | WO2005014350 | 2/2005 |
| WO | WO2012000579 | 1/2012 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

(Continued)

*Primary Examiner* — Brian P Sweeney
(74) *Attorney, Agent, or Firm* — Fish & Richardson P.C.

(57) ABSTRACT

A brake control system for operating brakes of an automated vehicle at slow speed includes a motion-detector and a controller. The motion-detector detects relative-movement of a host-vehicle relative to a stationary-feature located apart from the host-vehicle. The controller is configured to operate brakes of the host-vehicle. The controller determines a vehicle-speed of the host-vehicle based on the relative-movement when the vehicle-speed is less than a speed-threshold, and regulates brake-pressure of the brakes based on the vehicle-speed.

18 Claims, 2 Drawing Sheets

(56) References Cited

U.S. PATENT DOCUMENTS

2016/0221574 A1\* 8/2016 Ikuta ................... B60W 30/08
2017/0101081 A1   4/2017 Meier

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
International Search Report and Written Opinion in International Application No. PCT/US2018/036931, dated Aug. 29, 2018, 7 pages.
European Extended Search Report in European Application No. 18177228.6, dated Oct. 16, 2018, 7 pages.

\* cited by examiner

US 10,384,660 B2

SLOW SPEED AUTOMATED VEHICLE BRAKE PRESSURE CONTROL SYSTEM

TECHNICAL FIELD OF INVENTION

This disclosure generally relates to a brake control system for operating brakes of an automated vehicle at slow speed, and more particularly relates to a determines a vehicle-speed based on the relative-movement when the vehicle-speed is less than a speed-threshold, and regulates brake-pressure of the brakes based on the vehicle-speed.

BACKGROUND OF INVENTION

It is known that wheel-speed-sensors are slow to update at very slow vehicle-speeds, e.g. <5 kph. The slow update rate makes it difficult for an automated vehicle to accurately control brake-pressure at slow speeds to provide a pressure let-up for a smooth stop as vehicle approaches zero speed.

SUMMARY OF THE INVENTION

In accordance with one embodiment, a brake control system for operating brakes of an automated vehicle at slow speed is provided. The system includes a motion-detector and a controller. The motion-detector detects relative-movement of a host-vehicle relative to a stationary-feature located apart from the host-vehicle. The controller is configured to operate brakes of the host-vehicle. The controller determines a vehicle-speed of the host-vehicle based on the relative-movement when the vehicle-speed is less than a speed-threshold, and regulates brake-pressure of the brakes based on the vehicle-speed.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
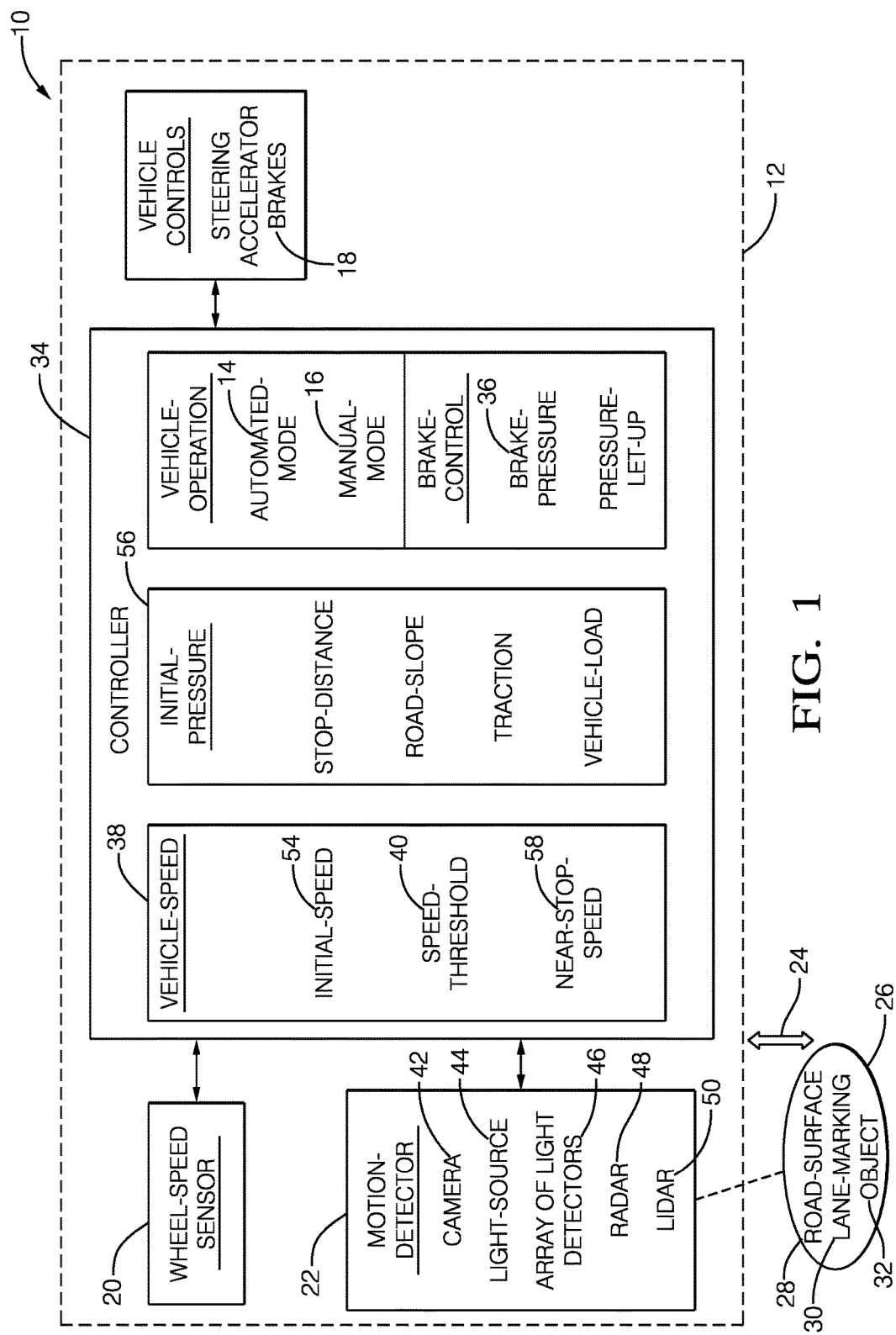
FIG. 1 is a diagram of a brake control system one embodiment.

FIG. 1 illustrates a non-limiting example of a brake control system 10, hereafter the system 10, which is suitable for operating the brakes 18 of an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than assisting the human-operator as needed to operate the brakes 18 to avoid interference with and/or a collision with, for example, another-vehicle. As will be described in more detail below, the system 10 described herein is an improvement over prior braking-systems because the system 10 provides for improved brake control at slow speed, e.g. at speeds less than five kilometers per hours (5 kph). The improvement overcomes the aforementioned problems with using a typical example of a wheel-speed-sensor 20, commercially available examples of which will be known by those in the art.

The system 10 includes a motion-detector 22 that detects a relative-movement 24 of the host-vehicle 12 relative to a stationary-feature 26 located apart from the host-vehicle 12. As used herein, the phrase 'apart from the host-vehicle 12 means that the stationary-feature 26 is not part of, or is not attached to, the host-vehicle 12. By way of example and not limitation, the stationary-feature 26 maybe a road-surface 28 of a roadway (not shown) upon which the host-vehicle 12 is traveling. The motion-detector may be configured to discern the relative-movement 24 of discernable details of the road-surface 28, where the discernable details are found in the texture or imperfections of the road-surface 28. Alternatively, the stationary-feature 26 may be a lane-marking 30, e.g. a lane-division-stripe, a turn-arrow, a cross-walk-marking, or any other taped-on or painted-on marking commonly found on roadways. Furthermore, the stationary-feature 26 may be an object 32, such as a sign, a lamp-post, or a curb. The relative-movement 24 is preferably due only to movement of the host-vehicle 12 which presumes that the stationary-feature 26 is indeed stationary, e.g. is not another moving vehicle. If an other-vehicle is verified to be stopped because it is, for example, waiting at red traffic-signal and the brake lights of the other-vehicle are illuminated, then it is contemplated that the other-vehicle may be used as the stationary-feature 26.

The system includes a controller 34 configured to operate the brakes 18 of the host-vehicle 12. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for controlling the brakes 18 based on signals received by the controller 34 from, but not limited to, the wheel-speed-sensor 20, and/or the motion-detector 22 as described herein.

As noted above, it is known to regulate the brake-pressure 36 (e.g. the pressure of hydraulic brake-fluid, or the force applied to brake-pads by an actuator) of the brakes 18 based on a signal from the wheel-speed-sensor 20. However, common configurations of the wheel-speed-sensor 20 generate pulses in response to, for example, the passing of teeth on a toothed-wheel or slotted-wheel that is mechanically coupled to the wheel of interest. As the vehicle-speed 38 approaches zero, the time between successive pulses may be too far apart for a brake-control-system to provide for a smooth stop. The system 10 described herein, or more specifically the controller 34, improves automated braking performance at slow speeds (e.g. <5 kph) because the controller 34 determines the vehicle-speed 38 of the host-vehicle 12 based on the relative-movement 24 determined using the motion-detector 22 when the vehicle-speed 38 is less than a speed-threshold 40. That is, during a braking-maneuver when the vehicle-speed 38 slows to less than the speed-threshold 40, the controller 34 regulates the brake-pressure 36 of the brakes 18 based on information or a signal from the motion-detector 22.

In one embodiment, the motion-detector 22 may include or may be formed of a camera 42 mounted on the host-vehicle 12 so that the camera 42 is oriented toward the road-surface 28 proximate to (e.g. immediately in front of, within two meters of) the host-vehicle 12. The road-surface serves as the stationary-feature and images rendered by the camera at different times are analyzed using, for example, motion-flow-analysis to determine how much the road-surface 28 appears to move in the images. From the images the vehicle-speed 38 can be determined as will be recognized by those in the art. It is contemplated that the camera may include an infrared-light to illuminate the road-surface 28.

In another embodiment, the motion-detector 22 may include or may be formed of a light-source 44 that directs light toward a road-surface proximate to the host-vehicle, and an array of light-detectors 46 that detect a pattern-of-light reflected by the road-surface 28. The combination of the light-source 44 and the array of light-detectors 46 is similar to that use in an optical-mouse for a person to control the position of a cursor on a computer display. Preferably, the light-source 44 emits infrared-light so the illumination by the light-source 44 is not detectable by human-vision. As used herein, the array of light-detectors 46 is envisioned to be limited to a relatively small number of pixels, and 18×18 array for example, so is not to be confused with the camera 42, which those in the art would instantly recognize to have arrays of more than 100×100 pixels.

In another embodiment, the motion-detector 22 may include or may be formed of a radar 48 mounted on the host-vehicle 12. The radar 48 is preferably oriented to detect instances of the objects 32 such as a sign, a lamp-post, or a curb proximate to the host-vehicle 12. As will be recognized by those in the art, radars in general are able to detect a range-rate of an object, from which the vehicle-speed 38 is readily determined. Alternatively, the motion-detector 22 may include or may be formed of a lidar 50 that is also suitable to determine a range-rate of an object. It is further contemplated that any combination of the above device implementations of the motion-detector 22 may be used to determine the vehicle-speed 38 when the vehicle-speed 38 is less than the speed-threshold 40, and that any combination of the road-surface 28, the lane-marking 30, the object 32, and/or anything that could be characterized as stationary with respect to the roadway can be used as the stationary-feature 26.

Figure 2:
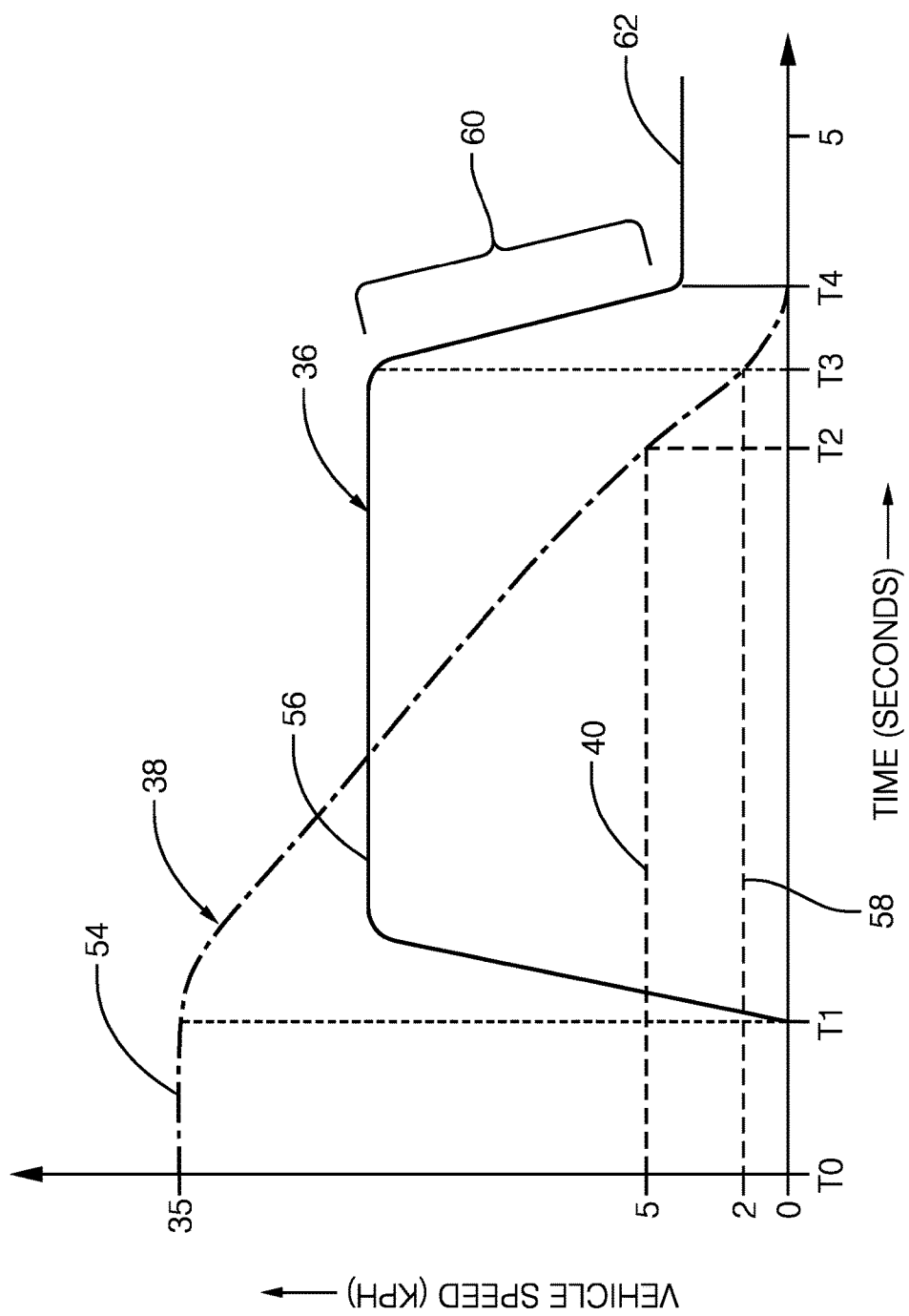
FIG. 2 is graph of a braking-maneuver executed by the system of FIG. 1 in accordance with one embodiment.

FIG. 2 illustrates a graph 52 that illustrates data related to a non-limiting example of a braking-maneuver executed by the system 10 to stop the host-vehicle 12. At time T0 the host-vehicle 12 is traveling at an initial-speed 54 of thirty-five kilometers-per-hour (35 kph). At time T1 the system begins to increase the brake-pressure 36 to an initial-pressure 56. The initial-pressure 56 may be selected or calculated based on a variety of factors that may include, but are not limited to, a stop-distance (the distance to a location before which the host-vehicle 12 must be stopped), a road-slope (e.g. is the roadway sloped downhill so the stopping distance is increased), traction (is the roadway dry or wet/icy), and vehicle-load (e.g. the host-vehicle 12 is heavily loaded and/or is towing a trailer).

At time T2 the vehicle-speed 38 decreases below the threshold-speed 40, 5 kph in this non-limiting example. Prior to time T2 the vehicle-speed 38 is monitored by the wheel-speed-sensor 20, and optionally by the motion-detector 22. That is, it is not a requirement that only the wheel-speed-sensor 20 be used to determine the vehicle-speed 38 when the vehicle-speed 38 is greater than the threshold-speed 40. Because the update-rate of many commercially available examples of the wheel-speed-sensor 20 is too low for precise brake-control, the motion-detector 22 is the preferred means to determine the vehicle-speed 38 when the vehicle-speed 38 is less than the speed-threshold 40.

At time T2 the vehicle-speed 38 decreases below a near-stop-speed, 2 kph for example. It is not desirable to maintain a constant value of the brake-pressure 36 until the host-vehicle 12 comes to a complete stop as this will impart an unpleasant jerk to any passenger of the host-vehicle 12. Accordingly, the brake-pressure 38 is reduced when the relative-speed 24 (i.e. the vehicle-speed 38) is less than the near-stop-speed 58. That is, the system 10 applies a let-up 60 of the brake-pressure 36 for smooth stop. Preferably, the brake-pressure 36 at the instant the host-vehicle 12 stops at time T4 is a holding-pressure 62 which is just enough to keep the host-vehicle 12 stopped until the brakes 18 are released.

Accordingly, a brake control system (the system 10), a controller 34 for the system 10, and a method of operating the system 10 is provided. The improved ability of the system to determine the vehicle-speed 36 while the host-vehicle is moving slowly, less than 5 kph for example, allows for smoother automated braking of the host-vehicle 12.

While this invention has been described in terms of the preferred embodiments thereof, it is not intended to be so limited, but rather only to the extent set forth in the claims that follow.

We claim:

1. A brake control system for operating brakes of an automated vehicle, the brake control system comprising:
   a motion-detector that detects relative-movement of a host-vehicle relative to a stationary-feature located apart from the host-vehicle, wherein the host-vehicle includes a wheel-speed-sensor, brakes, and vehicle controls for operating the brakes; and
   a controller communicatively coupled to the motion-detector, the wheel-speed-sensor, and the vehicle controls of the host-vehicle, the controller configured to operate the brakes by using the vehicle controls of the host-vehicle when the host-vehicle is operated in an automated-mode, wherein the controller determines a vehicle-speed of the host-vehicle based on the relative-movement detected by the motion-detector when the vehicle-speed is less than a speed-threshold, and regulates brake-pressure of the brakes based on the vehicle-speed.

2. The brake control system of claim 1, wherein the motion-detector includes a camera mounted on the host-vehicle, and the camera is oriented toward a road-surface proximate to the host-vehicle, and wherein the road-surface is the stationary-feature.

3. The brake control system of claim 1, wherein the motion-detector includes a light-source that directs light toward a road-surface proximate to the host-vehicle, and an array of light-detectors that detect a pattern-of-light reflected by the road-surface, and wherein a road-surface is the stationary-feature.

4. The brake control system of claim 1, wherein the motion-detector includes a radar mounted on the host-vehicle, and the radar is oriented to detect objects proximate to the host-vehicle, and wherein an object proximate to the host-vehicle is the stationary-feature.

5. The brake control system of claim 1, wherein the brake-pressure is reduced when the vehicle-speed is less than a near-stop-speed threshold.

6. The brake control system of claim 5, wherein the controller determines the vehicle-speed of the host-vehicle by using the wheel-speed-sensor when the vehicle-speed is at or above the speed-threshold, wherein an update-rate of the motion-detector is greater than an update-rate of the wheel-speed-sensor when the vehicle-speed is less than the speed-threshold.

7. The brake control system of claim 1, wherein the stationary-feature includes at least one of a stationary roadway object proximate to the host-vehicle, a road-surface, and a lane-marking.

8. The brake control system of claim 7, wherein the stationary roadway object includes a sign, a lamp-post, or a curb.

9. The brake control system of claim 1, wherein the controller regulates the brake-pressure of the brakes by reducing the brake-pressure when the vehicle-speed is less than the speed-threshold.

10. A method for operating brakes of an automated vehicle, the method comprising:
    detecting, by a motion-detector, relative-movement of a host-vehicle relative to a stationary-feature located apart from the host-vehicle, wherein the host-vehicle includes a wheel-speed-sensor, brakes, and vehicle controls for operating the brakes;
    determining, by a controller communicatively coupled to the motion-detector, the wheel-speed-sensor, and the vehicle controls of the host-vehicle, a vehicle-speed of the host-vehicle based on the relative-movement detected by the motion-detector when the vehicle-speed is less than a speed-threshold, wherein the controller is configured to operate the brakes by using the vehicle controls of the host-vehicle when the host-vehicle is operated in an automated-mode; and
    regulating, by the controller, brake-pressure of the brakes based on the vehicle-speed.

11. The method of claim 10, wherein the motion-detector includes a camera mounted on the host-vehicle, and the camera is oriented toward a road-surface proximate to the host-vehicle, and wherein the road-surface is the stationary-feature.

12. The method of claim 10, wherein the motion-detector includes a light-source that directs light toward a road-surface proximate to the host-vehicle, and an array of light-detectors that detect a pattern-of-light reflected by the road-surface, and wherein a road-surface is the stationary-feature.

13. The method of claim 10, wherein the motion-detector includes a radar mounted on the host-vehicle, and the radar is oriented to detect objects proximate to the host-vehicle, and wherein an object proximate to the host-vehicle is the stationary-feature.

14. The method of claim 10, wherein the brake-pressure is reduced when the vehicle-speed is less than a near-stop-speed threshold.

15. The method of claim 10, further comprising determining, by the controller, the vehicle-speed of the host-vehicle by using the wheel-speed-sensor when the vehicle-speed is at or above the speed-threshold, wherein an update-rate of the motion-detector is greater than an update-rate of the wheel-speed-sensor when the vehicle-speed is less than the speed-threshold.

16. The method of claim 10, wherein the stationary-feature includes at least one of a stationary roadway object proximate to the host-vehicle, a road-surface, and a lane-marking.

17. The method of claim 16, wherein the stationary roadway object includes a sign, a lamp-post, or a curb.

18. The method of claim 10, wherein regulating the brake-pressure of the brakes comprises reducing, by the controller, the brake-pressure when the vehicle-speed is less than the speed-threshold.

\* \* \* \* \*